United States Patent Office 3,739,033
Patented June 12, 1973

3,739,033
NOVEL FLUORINATED ALIPHATIC TRIETHERS
Louis G. Anello, Orchard Park, and Richard F. Sweeney, Elma, N.Y., assignors to Allied Chemical Corporation, New York, N.Y.
No Drawing. Filed Mar. 1, 1971, Ser. No. 120,065
Int. Cl. C07c 43/00
U.S. Cl. 260—615 F                 10 Claims

ABSTRACT OF THE DISCLOSURE

Perhaloisoalkyl ethers of α,ω-partially-fluorinated aliphatic ether diols useful as stable fluid dielectric coolants, inert liquid media for carrying out chemical reactions, hydraulic fluids, lubricants and as oxygen and carbon dioxide transport components of artificial blood compositions.

CROSS-REFERENCES TO RELATED APPLICATIONS (1) Copending U.S. application of Louis G. Anello, Richard F. Sweeney and Morton H. Litt, Ser. No. 818,832, filed Apr. 23, 1969, entitled "Polyfluoroisoalkoxyalkyl Halides" now abandoned.

(2) Copending U.S. application of Louis G. Anello, Richard F. Sweeney and Morton H. Litt, Ser. No. 721,113, filed Apr. 12, 1968, entitled "Terminally Unsaturated Fluoroolefins" now U.S. Pat. 3,577,465.

(3) Copending U.S. application of Louis G. Anello, Richard F. Sweeney and Morton H. Litt, Ser. No. 721,115, filed Apr. 12, 1968, entitled "Fluorocarbon Acids and Derivatives" now U.S. Pat. 3,697,564.

BACKGROUND OF THE INVENTION

This invention relates to novel aliphatic polyethers and more particularly to novel polyfluorinated aliphatic triethers. It is especially concerned with a novel class of perhaloisoalkyl ethers of partially fluorinated α,ω-aliphatic ether diols.

Recent development in the electrical and space industries have intensified the need for dielectric coolant fluids for miniaturized packages of heat-sensitive electronic components. For such purposes, dielectric fluid coolants in which the electronic components can be immersed are highly desirable. Such fluids, in addition to being good heat-transfer agents, should possess exceptionally good electrical insulating properties, such as high dielectric strengths and volume resistivities and low dissipation factors and dielectric constants. Such coolants should also be stable as fluids over a wide temperature range and should be non-toxic, non-flammable and non-explosive. In the past, such requirements have been met at least partially by fluorinated perhalogenated ethers which have provided dielectric coolant systems of lighter weight and smaller volume than prior art non-flourinated fluids. While such fluorinated perhaloether fluid coolants have proved of great value, their application has been limited by the relatively few different structural classes of fluorinated perhalogenated ethers which are available and by the tendency to even greater miniaturization of electronic equipment and higher efficiency requirements.

It is the object of the present invention to provide a novel class of fluorinated aliphatic triethers.

It is another object of the invention to prepare novel stable dielectric coolant fluids.

These and other objects and advantages will be apparent from the following description of our invention.

SUMMARY OF THE INVENTION

The above objects are attained according to the invention in a novel class of fluorinated aliphatic triethers of the structural formula $R_f OR_{ff}$ wherein $R_f$ aind $R_{ff}$ are like or unlike radicals of the formula

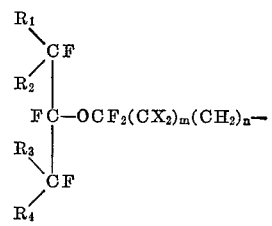

wherein
(i) $R_1$, $R_2$, $R_3$ and $R_4$, independently at each occurrence are fluorine, chlorine or perhaloalkyl, or one of $R_1$ and $R_2$ and one of $R_3$ and $R_4$, when taken together, are perhaloalkylene groups forming a homocyclic aliphatic structure of from 4 to 6 carbon atoms, which $R_1$–$R_4$ groups may have from 1 to 9 carbon atoms and which halo substituents thereof are fluorine or chlorine, with the proviso that no more than three of the $R_1$–$R_4$ groups are perhaloalkyl groups
(ii) X, which may be the same or different in different $CX_2$ groups, is hydrogen or fluorine
(iii) $m$ is 0 to 38
(iv) $n$ is an integer of 1 or 2

The critical structural features of the present novel compounds are considered to be the three ether oxygen substituents, the two terminal fluorinated perhaloisoalkoxy groups each attached to a difluoromethylene radical, and the two non-fluorinated methylene radicals to which the central ether oxygen is bonded.

The present compounds are readily prepared by known reaction techniques from the corresponding fluorinated perhaloisoalkoxy-fluoroalkyl iodides, alcohols or alkali metal alcoholates.

Symmetrical ethers of the invention, that is ethers of the above structural formula wherein $R_f = R_{ff}$, are conveniently prepared according to known reaction techniques by reaction (Equation 1) of oleum with the perhaloisoalkoxy-fluoroalkyl iodide (I) followed by acid hydrolysis (Equation 2) of the resultant sulfuric acid half ester (II) to the corresponding alcohol (III) and intermolecular acid-catalyzed dehydration (Equation 3) of the latter to form the desired ether.

Equation 1 ($R_f = R_{ff}$ has the meaning given above)

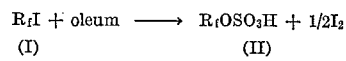

Equation 2 ($R_f = R_{ff}$ has the meaning given above.

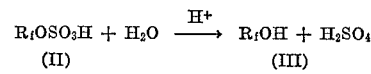

Equation 3 ($R_f = R_{ff}$ has the meaning given above)

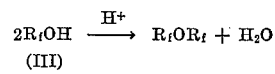

The conversion of the iodide (I) to the corresponding alcohol (III) via the corresponding sulfuric acid half-ester (II) according to Equations 1–2 is carried out by treating the iodide with about 20–25% oleum at about 85 to 100° C., and thereafter diluting the initial reaction mixture containing the aforementioned sulfuric acid ester with water to provide a sulfuric acid concentration of about 35–80 weight percent and heating the diluted mass at about 100–105° C. to obtain the alcohol (III) in substantial record with the procedure of British Pat. 994,607 issued June 10, 1965. The desired ether which is formed as a by-product of the reaction of Equation 2 via the intermolecular dehydration of the alcohol (III) in accordance with Equation 3 above, can be readily separated from the alcohol and the other constituents of the crude reaction mass by conventional means, for example fractional distillation, under diminished pressure. The recovered alcohol can be reacted with additional aqueous sulfuric acid to form additional amounts of the desired ether in accord with Equation 3. The intermolecular dehydration of aliphatic alcohols to the corresponding ethers in the presence of a sulfuric acid catalyst is a conventional technique which is disclosed in "Rodd's Chemistry of Carbon Compounds," section edition, Elsevier Publishing Co., New York, 1965, volume I, Part B, page 47.

The novel triethers of the invention can also be prepared by reaction of the aforementioned fluorinated perhaloisoalkoxyfluoroalkyl iodides (I) with the alkali metal salts (IV), that is alkali metal alcoholates, of the aforementioned fluorinated perhaloisoalkoxy fluoroalkyl alcohols (III) according to the reaction of Equation 4 below. This conventional procedure can be used to prepare either symmetrical or unsymmetrical ethers of the invention.

Equation 4 ($R_f$ and $R_{ff}$ have the meanings given above, M is cation of an alkali metal)

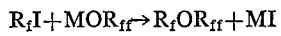

$$R_fI + MOR_{ff} \rightarrow R_fOR_{ff} + MI$$

(I)    (IV)

This technique, which involves heating the iodide (I) and alkali metal alcoholate (IV) in liquid organic medium, is disclosed in Carter et al. U.S. Patent 1,459,177, issued June 19, 1923.

Both symmetrical and unsymmetrical ethers of the invention are also prepared by reaction of an alkali metal salt (V) of the aforementioned sulfuric acid half ester of the fluorinated perhaloisoalkoxy fluoroalkyl alcohol and the alkali metal salt (IV) of such alcohol according to Equation 5 below.

Equation 5 ($R_f$, $R_{ff}$ and M have the meanings given above)

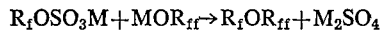

$$R_fOSO_3M + MOR_{ff} \rightarrow R_fOR_{ff} + M_2SO_4$$

(V)    (IV)

This preparatory technique, which is also old in the art, is disclosed in "Rodd's Chemistry of Carbon Compounds," ibid.

The fluorinated perhaloisoalkoxyfluoroalkyliodides which are utilized in the foregoing procedures to prepare the novel ethers of the invention correspond to the structural Formula VI below.

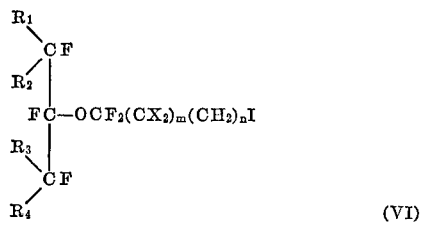

(VI)

wherein $R_1$, $R_2$, $R_3$ and $R_4$, $m$ and $n$ have the meanings given above.

The iodide intermediates are prepared by condensation, that is telomerization, of a telogen iodide of Formula VII below with a telomerizable olefin selected from the group, ethylene, tetrafluoroethylene and vinylidene fluoride.

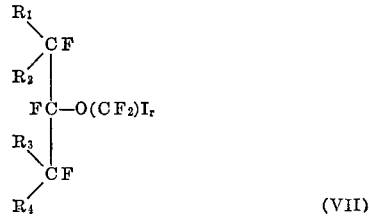

(VII)

wherein $R_1$, $R_2$, $R_3$ and $R_4$ have the meanings given above and $r$ is 1 to 2.

Telogen iodides of Formula VII wherein $r$ is 2 are disclosed in Litt et al. U.S. Patent 3,453,333, and in Evans et al. U.S. Patent 3,470,256.

Telogen iodides of Formula VII wherein $r$ is 1 are prepared from the aforementioned telogen iodides of Formula VII wherein $r$ is 2 by liquid phase reaction with sulfur trioxide at 50–175° C. to replace the iodide substituent with the radical —COF, hydrolysis of the resultant acyl fluoride to the corresponding carboxylic acid, neutralization of the resultant carboxylic acid with alkali-free silver oxide and finally iodination of the resultant silver carboxylate to form the desired telogen iodide of Formula VII wherein $r$ is 1.

The aforementioned telomerization of telogen iodides of Formula VII, which may be effected stepwise employing different telomerizable olefins in the various steps, is carried out in accordance with the procedure described by Anello et al. U.S. Patent 3,514,487, issued May 26, 1970. Telomerization reactions involving vinylidene fluoride provide two telomerization products or telomers, namely a principal telomer product wherein the alkyl residue of the telogen iodide is attached to the methylene group of the telomer and the iodide of the telogen is attached to the difluoromethylene group of the product and a minor product wherein the alkyl residue of the telogen is attached to the difluoromethylene group in the telomer and the iodide residue of the telogen is attached to the methylene group of the telomer, which products are readily separated by conventional techniques.

As will be apparent to those skilled in the art only telomer iodide products terminating in the —$CH_2I$ moiety can be used directly in preparing the novel ethers of the invention according to the reactions of Equations 1–4 above. However, telomer iodides of the aforementioned telomerization reactions which terminate in —$CF_2I$ moieties can, by the following synthetic routes, be converted to the desired iodide starting materials of Formula VI or can be converted to alcohols of Formula III above which can, in turn be converted directly to the present novel ethers.

Telomer iodides terminating in the moiety —$CF_2CF_2I$ are treated with sulfur trioxide to convert the —$CF_2CF_2I$ group to the —$CF_2COF$ group, followed by alcoholysis of the —$CF_2COF$ group to —$CF_2COOCH_3$ and subsequent $LiAlH_4$ reduction of the latter group to $CF_2CH_2OH$. The resultant alcohol can be used directly in preparation of the present ethers according to the reaction of Equation 3 above. Alternatively the —$CF_2CH_2OH$ group of the alcohol is reacted conventionally with p-toluenesulfonyl chloride to form the corresponding

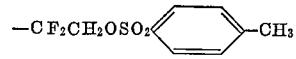

group which by known reaction with alcoholic alkali metal iodide is converted to the desired —$CF_2CH_2I$ substituent. The aforementioned conversion of —$CH_2CH_2I$ moieties to —$CF_2CH_2OH$ groups is disclosed in Canadian Patent 852,256 issued September 22, 1970. The foregoing procedure for converting primary aliphatic alcohol groups, such as —$CF_2CH_2OH$, to the corresponding alkyl iodide groups, such as —$CF_2CH_2I$, by reaction with p-toluene sulfonyl chloride and conversion of the resultant p-toluenesulfonate ester group to an alkyl iodide moiety, is disclosed in Method 208, Lovelace et al. "Aliphatic Fluorine Compounds," Reinhold Publishing Corporation, 1958, page 42. The foregoing reaction sequence is also utilized to convert the telogen iodide represented by (VII) wherein $r$ is 2 to the corresponding iodide starting material represented by Formula VI wherein $m$ is 0 and $n$ is 1 which iodide product can also be employed as a telogen iodide in the aforementioned telomerization reactions.

Telomer iodides terminating in the group $-CH_2CF_2I$ are treated with alcoholic alkali metal hydroxide to remove hydrogen iodide to form the moiety $-CH=CF_2$. The latter group is oxidized by alkali metal permanganate or dichromate to form the group $-COOH$ which is esterified and reduced to the group $-CH_2OH$ with lithium aluminum hydride. The resultant alcohol can be converted directly to the ethers of the invention according to the reaction of Equation 3 above. Alternatively the $-CH_2OH$ group of the alcohol is converted to $-CH_2I$ by reaction with p-toluene sulfonyl chloride and subsequent reaction of the resultant p-toluenesulfonate ester group with alcoholic alkali metal iodide according to the aforementioned conventional procedure of Lovelace et al. The conversion of the $-COOH$ group to $-CH_2OH$ via conventional esterification and $LiAH_4$ reduction of the resultant ester is more particularly described in the aforementioned Canadian Patent 852,256.

In preferred compounds of the invention as delineated by the above general formula, $R_f$ and $R_{ff}$ are like radicals, $m$ is at least 1 or $n$ is 2. Still preferably when $m$ is 1, $R_1$, $R_2$, $R_3$ and $R_4$ are fluorine, perfluoroalkyl radicals or one of $R_1$ and $R_2$ and one of $R_3$ and $R_4$, when taken together, are perfluoroalkylene groups forming a homocyclic aliphatic structure.

An especially preferred class of ethers of the invention correspond to the structural Formula VIII below $$[(CF_3)_2CFO(CF_2)_x(CH_2)_y]_2O \qquad (VIII)$$

wherein $x$ is an integer 1 to 20 and $y$ is an integer 2 to 20.

The particularly preferred novel ethers of Formula VIII wherein $y$ is an integer 3 to 20 are conveniently obtained from a perfluorinated isopropoxy alkyl iodide (IX), prepared as described above, by condensation with a terminally unsaturated aliphatic alcohol (X) in the presence of a catalyst such as alpha, alpha-azobisisobutyronitrile in accord with Equation 6 below to form a fluorinated isopropoxy-iodoalkyl alcohol (XI) followed by reductive deiodination of the latter product with a suitable reducing agent such as $LiAlH_4$ to form the corresponding iodine-free alcohol (XII) according to Equation 7 below. The latter alcohol (XII) is readily converted to the desired preferred ether (XIII) by acid-catalyzed intermolecular dehydration in accord with the reaction of Equation 3 above.

Equation 6 ($x$ has the meaning given above and $y$ is an integer of 3 to 20)

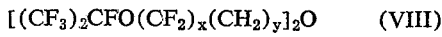

$$(CF_3)_2CFO(CF_2)_xI + CH_2=CH(CH_2)_{y-2}-OH \xrightarrow{catalyst}$$
$$(IX) \qquad (X)$$
$$(CF_3)_2CFO(CF_2)_xCH_2CH(CH_2)_{y-2}-OH$$
$$\underset{(XI)}{\overset{I}{|}}$$

Equation 7 ($x$ has the meaning given above and $y$ is an integer 3 to 20)

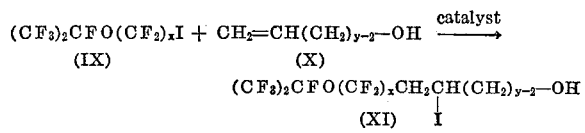

$$(CF_3)_2CFO(CF_2)_xCH_2-CH(CH_2)_{y-2}-OH + [H] \xrightarrow{LiAlH_4}$$
$$\qquad\qquad\qquad \overset{|}{I}$$
$$(XI)$$

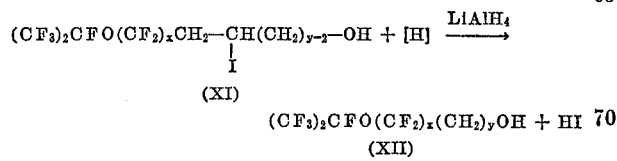

$$(CF_3)_2CFO(CF_2)_x(CH_2)_yOH + HI$$
$$(XII)$$

The foregoing reactions of Equations 6 and 7 are more particularly described in aforementioned Canadian Patent No. 852,256.

The novel fluorinated aliphatic triethers of the invention are heat transfer agents having exceptionally good electrical insulating properties such as high dielectric strength and volume resistivity and low dissipation factor and dielectric constant. The present ethers are also stable as fluids over wide temperature ranges. The foregoing properties render these novel compounds particularly useful as dielectric liquid and/or vapor phase coolants for heat sensitive electronic apparatus, particularly in such coolant systems which are exposed to environmental conditions of extreme high and low temperatures. Moreover, the present novel ethers are useful as hydraulic fluids; dielectric media; lubricants; inert liquid media for carrying out chemical reactions, particularly reactions of fluorocarbons; and as oxygen and carbon dioxide transport components of artificial blood compositions of the type disclosed in Chemical and Engineering News, vol. 48 (May 18, 1970) pages 30–31.

In the following examples which serve to illustrate our invention, percentages and proportions are by weight unless otherwise noted and temperatures are in degrees centigrade.

EXAMPLE 1

A reaction flask is charged with 9000 g. of 20% oleum. With vigorous agitation, 3000 g. (6.83 moles) of

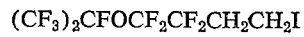

$$(CF_3)_2CFOCF_2CF_2CH_2CH_2I$$

are added over a 45-minute period as the oleum is heated from 25° to 77°. Heating is continued for 1 hour at 90–100°. To hydrolyze the intermediary hydrosulfate, 8000 g. of 48% $H_2SO_4$ are charged to the reaction mixture to give a final sulfuric acid content of 75%. The mixture is heated to 110° for 8 hours. The water-insoluble oil which separates is decanted, washed with 10% aqueous sodium metabisulfite to remove elemental iodine, dried and fractionally distilled to give 37 g. (0.084 mole) of $(CF_3)_2CFOCF_2CF_2CH_2CH_2I$, B.P. 138–140°/760 mm., 1081 g. (3.28 moles) of

$$(CF_3)CFOCF_2CF_2CH_2CH_2OH$$

B.P. 52–54°/10 mm., 443 g. (0.69 mole) of the desired product, bis-(1,1,2,2 - tetrahydrotetrafluoro - 4 - heptafluoroisopropoxybutyl)ether, B.P. 82–84°/4 mm. and 530 g. (0.73 mole) of $[(CF_3)_2CFOCF_2CF_2CH_2CH_2O]_2SO_2$, B.P. 130–134°/3 mm. The triether product has a freezing point of −74°, a density of 1.60 g./cc. at 25°, a dielectric strength of 12.2 kv./0.1" (according to the method of ASTM–D–877); a dielectric constant of 3.37 at 1 kc. (according to the method of ASTM–D–150); a dissipation factor of 0.00021 at 1 kc. (according to the method of ASTM–D–150); and a volume resistivity of $7.78 \times 10^{10}$ ohm-cm. (according to the method of ASTM–D–257).

Infrared and nuclear magnetic resonance spectrograph analyses of the triether product are consistent with the following structural formula

$$[(CF_3)_2CFOCF_2CF_2CH_2CH_2]_2O$$

Analytical data: Calcd. for $C_{14}F_{22}H_8O_3$ (percent): C, 26.17; F, 65.19; H, 1.25; S, none; I, none. Found (percent): C, 25.49; F, 63.68; H, 1.35; S, none; I, none.

EXAMPLE 2

In substantial accord with the procedure of Example 1, 2758, g. (5.07 moles) of $(CF_3)_2CFO(CF_2CF_2)_2CH_2CH_2I$ is charged over an 80 minute period to 7200 g. of 20% oleum which is agitated at 90 to 100° during the addition.

The reaction mixture is stirred for 1.5 hours and is then cooled to room temperature. This crude mixture is slowly added to 16,000 ml. of water containing 1050 g. of $Na_2S_2O_5$ and the mixture is maintained at 100° for 4 hours to remove elemental iodine. The water-insoluble oil which separates is decanted, dried and fractionally distilled under diminished pressure to give 158 g. 0.29 mole) of $(CF_3)_2CFO(CF_2CF_2)_2CH_2CH_2I$, B.P. 72–75°/15 mm., 1394 g. (3.24 moles) of $$(CF_3)_2CFO(CF_2CF_2)_2CH_2CH_2OH$$

B.P. 61–33°/4 mm. and 77 g. (0.91 mole) of the desired product, bis-(1,1,2,2-tetrahydro-octafluoro-6-heptafluoro-isopropoxyhexyl)ether, B.P. 100–102°/1 mm.

Infrared and nuclear magnetic resonance spectrographic analyses of the product are consistent with the following structural formula $$[(CF_3)_2CFOCF_2CF_2CF_2CF_2CH_2CH_2]_2O$$

Analytical data: Calcd. for $C_{18}F_{30}H_8O_3$ (percent): C, 25.61; F, 67.62; H, 0.95; I, none; S, none. Found (percent): C, 26.10; F, 67.24; H, 0.84; I, none; S, none.

EXAMPLE 3

In substantial accord with the preparatory procedure of Example 1, 2724 g. (4.25 mole) of $$(CF_3)_2CFO(CF_2CF_2)_3CH_2CH_2I$$

is charged over a period of 75 minutes to 7200 g. of 20% oleum maintained with vigorous agitation at 85–95° during the addition. The reaction mixture is stirred for 90 minutes and is then cooled to room temperature. This crude mixture is slowly added to 16,000 ml. water containing 1050 g. $Na_2S_2O_5$ and the mixture is maintained at 100° C. for 4 hours. The water-insoluble oil which separates is decanted, dried and fractionally distilled to give 114 g. (0.18 mole) of $$(CF_3)_2CFO(CF_2CF_2)_3CH_2CH_2I$$

B.P. 78–79°/4 mm., 1485 g. (2.8 moles) of $$(CF_3)_2CFO(CF_2CF_2)_3CH_2CH_2OH,$$

B.P. 80–81°/4 mm. and 57 g. (0.064 mole) of the desired product, bis-(1,1,2,2-tetrahydrododecafluoro-8-heptafluoroisopropoxyoctyl)ether, B.P. 138–140°/1 mm.

Infrared and nuclear magnetic resonance spectrographic analyses of the product are consistent with the following structural formula $$[(CF_3)_2CFOCF_2CF_2CF_2CF_2CF_2CF_2CH_2CH_2]_2O$$

Analytical data: Calcd. for $C_{22}F_{38}H_8O_3$ (percent): C, 25.35; F, 69.02; H, 0.76; I, none; S, none. Found (percent): C, 25.78; F, 69.54; H, 0.72; I, none; S, none.

EXAMPLE 4

To a 300 ml. 3-necked flask containing 102 g. 96% sulfuric acid is charged 100 g. (0.31 mole) of $$(CF_3)_2CFOCF_2CF_2CH_2CH_2OH.$$

On addition of the alcohol the temperature of the mixture rises rapidly from about 30° to 55°. The mass is then heated with agitation to 100° and maintained at the latter temperature for two hours. After addition of 50 g. of water to provide a sulfuric acid concentration of about 72% in the mixture, the mass is heated at 110–115° for two hours and cooled to room temperature. The water-insoluble oil which separates as the lower layer of the mass is decanted, washed with water, dried and fractionally distilled under diminished pressure. There is recovered 80 g. (0.24 mole) of unreacted $$(CF_3)_2CFOCF_2CF_2CH_2CH_2OH,$$

B.P. 50°/10 mm., 3.15 g. (0.005 mole) of the desired product, bis-(1,1,2,2-tetrahydrotetrafluoro - 4 - heptafluoroisopropoxybutyl)ether of Example 1, B.P. 84°/3 mm. and 16.4 g. (0.026 mole) of $$[(CF_3)_2CFOCF_2CF_2CH_2CH_2O]_2SO_2,$$

B.P. 115°/1 mm.

By the synthetic technique of Example 1, the following additional ethers of the invention can be prepared from the corresponding fluorinated isoalkoxyalkyl iodides:

$2(CF_3)_2CFOCF_2CF_2CH_2I \rightarrow$
  $[(CF_3)_2CFOCF_2CF_2CH_2]_2O$ $2(CF_3)_2CFOCF_2CH_2I \rightarrow [(CF_3)_2CFOCF_2CH_2]_2O$ $2(CF_3)_2CFOCF_2CH_2CF_2CH_2I \rightarrow$
  $[(CF_3)_2CFOCF_2CH_2CF_2CH_2]_2O$ $2(CF_3)_2CFOCF_2(CH_2CF_2)_4CH_2I \rightarrow$
  $[(CF_3)_2CFOCF_2(CH_2CF_2)_2CH_2]_2O$ $2(CF_3)CFOCF_2(CH_2CF_2)_{19}CH_2I \rightarrow$
  $[(CF_3)_2CFOCF_2(CH_2CF_2)_{19}CH_2]_2O$

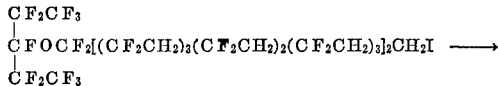

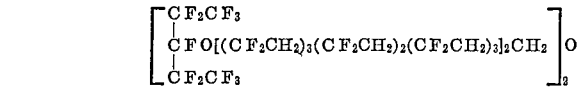

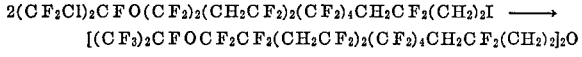

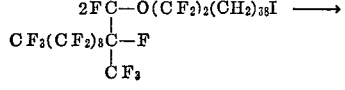

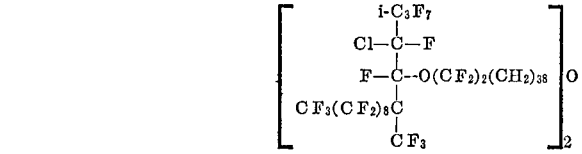

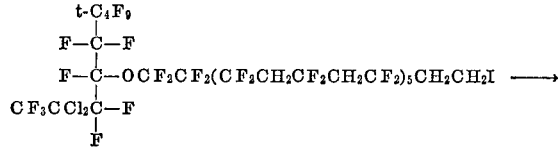

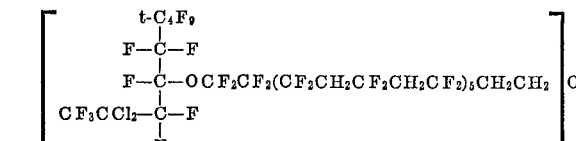

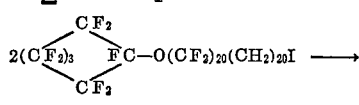

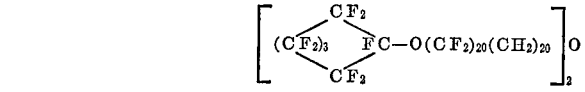

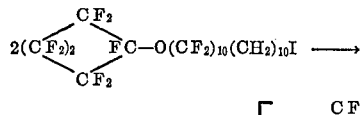

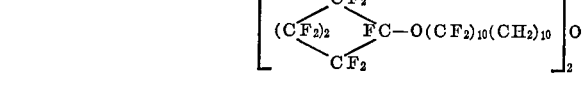

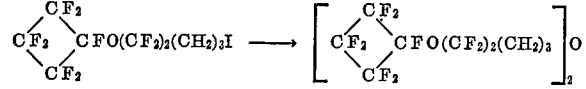

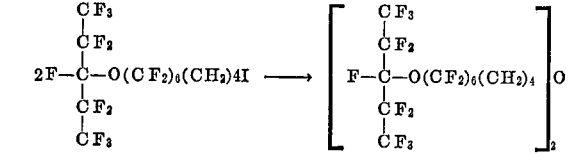

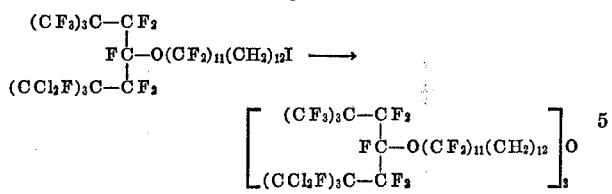

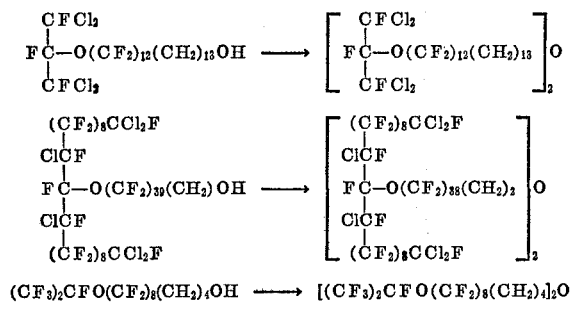

By the synthetic technique of Example 4 the following additional ethers of the invention can be prepared from the corresponding fluorinated isoalkoxy alkyl alcohols.

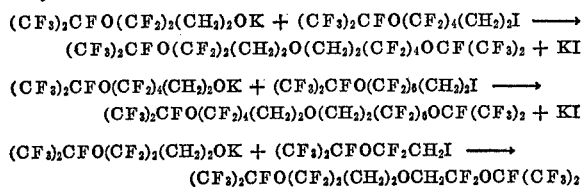

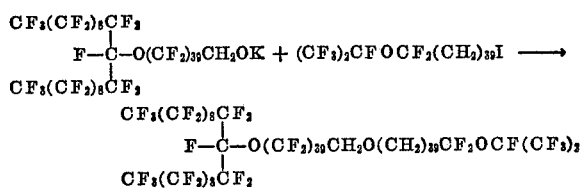

$(CF_3)_2CFO(CF_2)_8(CH_2)_4OH \longrightarrow [(CF_3)_2CFO(CF_2)_8(CH_2)_4]_2O$ $(CF_3)_2CFO(CF_2)_{10}(CH_2)_{11}OH \longrightarrow [(CF_3)_2CFO(CF_2)_{10}(CH_2)_{11}]_2O$ By the technique of the reaction of Equation 4 above the following unsymmetrical ethers of the invention can be prepared in accordance with the general equation $$R_fOK + R_{ff}I \rightarrow R_fOR_{ff} + KI$$

wherein $R_f$ and $R_{ff}$ are different fluorinated isoalkoxy-alkyl radicals as defined above.

$(CF_3)_2CFO(CF_2)_2(CH_2)_2OK + (CF_3)_2CFO(CF_2)_4(CH_2)_2I \longrightarrow$
$(CF_3)_2CFO(CF_2)_2(CH_2)_2O(CH_2)_2(CF_2)_4OCF(CF_3)_2 + KI$ $(CF_3)_2CFO(CF_2)_4(CH_2)_2OK + (CF_3)_2CFO(CF_2)_6(CH_2)_2I \longrightarrow$
$(CF_3)_2CFO(CF_2)_4(CH_2)_2O(CH_2)_2(CF_2)_6OCF(CF_3)_2 + KI$ $(CF_3)_2CFO(CF_2)_2(CH_2)_2OK + (CF_3)_2CFOCF_2CH_2I \longrightarrow$
$(CF_3)_2CFO(CF_2)_2(CH_2)_2OCH_2CF_2OCF(CF_3)_2$

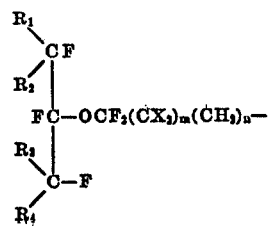

We claim:
1. Compounds of the formula

$$R_f\text{—O—}R_{ff}$$

wherein $R_f$ and $R_{ff}$ are like or unlike radicals of formula

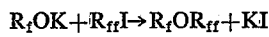

wherein
(i) $R_1$, $R_2$, $R_3$ and $R_4$ independently at each occurrence are fluorine, chlorine or perhaloalkyl, or one of $R_1$ and $R_2$ and one of $R_3$ and $R_4$, when taken together, are perfluoroalkylene groups forming a homocyclicaliphatic structure of from 4 to 6 carbon atoms, which $R_1$–$R_4$ groups may have from 1 to 9 carbon atoms and which halogen substituents thereof are fluorine or chlorine with the proviso that no more than three of the $R_1$–$R_4$ groups are perhaloalkyl groups
(ii) X, which may be the same or different in different $CX_2$ groups, is hydrogen or fluorine
(iii) $m$ is 0 to 38
(iv) $n$ is an integer 1 or 2

2. Compounds as claimed in claim 1 wherein $R_f$ and $R_{ff}$ are like radicals.

3. Compounds as claimed in claim 1 wherein $m$ is at least 1.

4. Compounds as claimed in claim 1 wherein $n$ is 2.

5. Compounds as claimed in claim 3 wherein $R_1$, $R_2$, $R_3$ and $R_4$ are fluorine, perfluoroalkyl radicals of 1 to 9 carbon atoms of one of $R_1$ and $R_2$ and one of $R_3$ and $R_4$, when taken together, are perfluoroalkylene groups forming a homocyclic aliphatic structure.

6. Compounds as claimed in claim 1 having the formula $$[(CF_3)_2CFO(CF_2)_x(CH_2)_y]_2O$$

wherein $x$ is an integer 1 to 20 and $y$ is an integer 2 to 20.

7. A compound as claimed in claim 6 having the formula $$[(CF_3)_2CFOCF_2CF_2CH_2CH_2]_2O$$

8. A compound as claimed in claim 6 having the formula $$[(CF_3)_2CFOCF_2CF_2CF_2CF_2CH_2CH_2]_2O$$

9. A compound as claimed in claim 6 having the formula $$[(CF_3)_2CFOCF_2CF_2CF_2CF_2CF_2CF_2CH_2CH_2]_2O$$

10. A compound as claimed in claim 2 having the formula $$[(CF_3)_2CFOCF_2CH_2]_2O$$

References Cited
UNITED STATES PATENTS

| | | | |
|---|---|---|---|
| 3,549,711 | 12/1970 | Merrill et al. | 260—615 R |
| 3,420,793 | 1/1969 | Pittman et al. | 260—615 R X |
| 3,435,078 | 3/1969 | Nychka et al. | 260—615 R |
| 3,637,868 | 1/1972 | Nychka | 260—615 R |
| 2,824,141 | 2/1958 | Zisman et al. | 260—615 R |
| 2,831,033 | 6/1958 | O'Rear | 260—615 R X |

OTHER REFERENCES

Weinmayr: J. Org. Chem., 28 (1963), pp. 492–494.

HOWARD T. MARS, Primary Examiner

U.S. Cl. X.R.

260—458, 611 R, 633

UNITED STATES PATENT OFFICE
CERTIFICATE OF CORRECTION

Patent No. 3,739,033  Dated June 12, 1973

Inventor(s) Louis G. Anello and Richard F. Sweeney

It is certified that error appears in the above-identified patent and that said Letters Patent are hereby corrected as shown below:

Col. 1, line 60 - "even" should read -- ever --;

Col. 3, line 1 - " record" should read -- accord --;

Col. 3, line 1 - "994,607" should read -- 994,607, --;

Col. 3, line 15 - "section" should read -- second --;

Col. 4, first formula - that part which reads " $-O(CF_2)I_r$ " should read -- $O(CF_2)_rI$ --;

Col. 7, line 68 - "B.P. 50°" should read -- B.P. 54° --;

Col. 8, line 12 - that part of the formula which reads "$2(CF_3)CFO$" should read -- $2(CF_3)_2CFO$ --;

Col. 10, line 6 - "atoms," should read -- atoms; --;

Col. 10, line 23 - "atoms of" should read -- atoms or --.

Signed and sealed this 9th day of July 1974.

(SEAL)
Attest:

McCOY M. GIBSON, JR.
Attesting Officer

C. MARSHALL DANN
Commissioner of Patents